June 22, 1954
W. E. BARRUS
2,681,806
VALVE GATE TURNING JIG
Filed Nov. 23, 1949
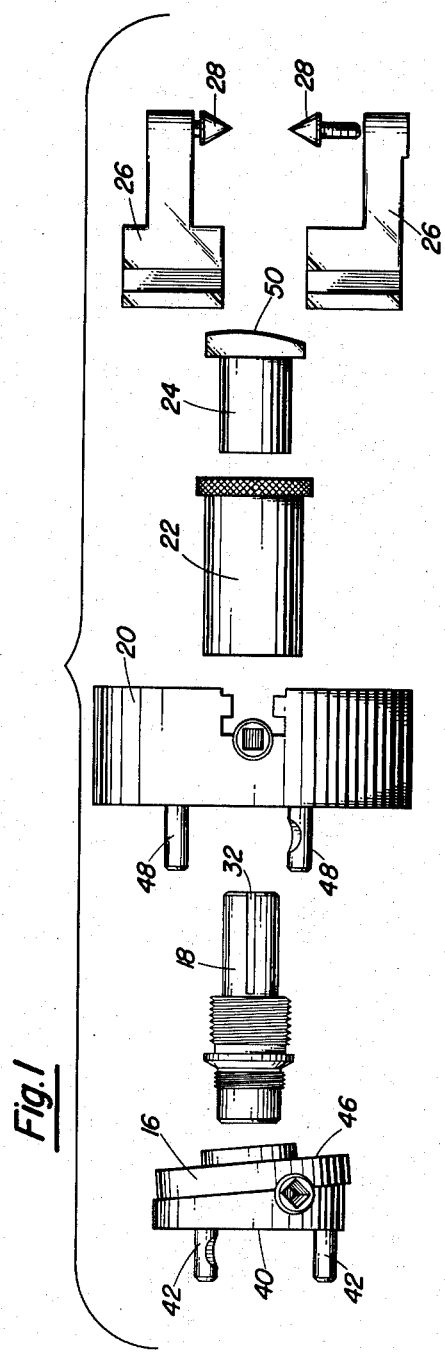
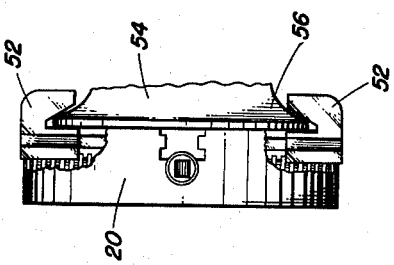
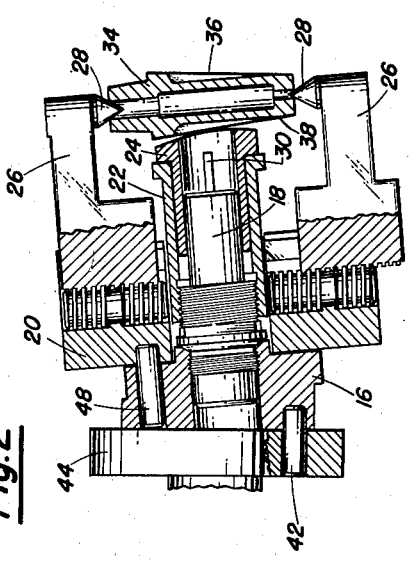
INVENTOR.
Walter E. Barrus
BY
Attorney Patented June 22, 1954

2,681,806

UNITED STATES PATENT OFFICE 2,681,806

VALVE GATE TURNING JIG

Walter Elvin Barrus, San Francisco, Calif.

Application November 23, 1949, Serial No. 129,164

7 Claims. (Cl. 279—5)

(Granted under Title 35, U. S. Code (1952), sec. 266)

This invention relates to jigs and particularly to method and means for machining gate valve gates and gate valve seats for receiving said gates in sealing engagement therewith.

Valve gates are almost universally wedge-shaped and include a pair of opposed, inclined, annular sealing surfaces, or faces, each of which surfaces must be machined smooth for mating engagement with a correspondingly smooth-machined valve seat. Valve gates are normally cast and are formed with a core, which core is removed to leave a core cavity. This cavity includes a cylindrical portion which is threaded or otherwise adapted to receive a gate stem, the axis of the cylindrical portion being coincident with the axis of the stem and being herein defined as the cavity axis of the gate. Since it is desirable to so mount the gate in a lathe that the surface being machined is mounted perpendicular to the axis of the lathe spindle, the prior art has used an offset adapter. The work engaging face of the prior art adapter is inclined to the spindle axis at an angle which is the complement of the sum of the angles formed between each inclined face of the gate and the cavity axis thereof, this angular sum being known as the included angle.

Thus, since gate faces are normally inclined at 5° to the cavity axis, resulting in an included angle of 10°, the work engaging face of the offset adapter is inclined at 10° to the adapter face that is connected to the face plate of a lathe. This prior art offset adapter is fixed to the face plate of a lathe chuck, and one face of the valve gate is clamped to the inclined face of the adapter, thus bringing the other face of the gate perpendicular to the axis of the lathe spindle. One face of the valve gate is machined, the valve gate is reversed, and the other face is then machined until the desired outside thickness of valve gate is reached.

It will be seen that this method of manufacture will produce defective valve gates, since there is no way of controlling the relative depth of cut on the faces. Thus, if the lower cavity channel of the valve were one-half inch in diameter, and it were desired to have the lower portion of the valve one inch thick, there would be one-half inch of metal in the finished valve gate. It is desirable that this metal be equally distributed on either side of the cavity axis, that is, that each wall be one-quarter inch in thickness. However, since the valve produced according to the above-described method is not machined relative to the axis of the inner cavity, it often happens that one wall will be seven-sixteenths of an inch thick and the other wall one-sixteenth of an inch thick. Such a valve gate is defective, since it is subject to early breakdown. Further, since the two faces of the gates are not machined relative to a fixed axis, it will be apparent that the gate can easily be rotated through an angle about its longitudinal axis when it is turned over for machining of the second face, after the first face has been machined. In this event, machining of the second face would not result in a wedge-shaped gate; for example, if the gate had been rotated through 180° about the longitudinal axis, as well as through 180° about the cavity axis thereof, the body portion of the gate would be cylindrical rather than wedge-shaped, and the opposed faces would be parallel.

It will be apparent that a similar analysis can be made with respect to the machining of the seats formed in the gate valve bodies for mating engagement with the annular surfaces of the gate. These seats must be so inclined and so positioned within the valve body that they will cooperate with the gate to form a seal. Since the problem of machining the valve body seats is substantially the same as the problem of machining the valve gate, and since the jig disclosed herein, with a possible exception of the chuck jaws, is identical in either case, the specification is for clarity primarily addressed to a method and means for accurately machining valve gates. It is to be understood, however, that both valve gates and valve seats corresponding thereto can be equally well accurately machined by the jig disclosed herein.

It is therefore a prime object of the invention to provide a method and means for producing valve gates that have walls of equal and predetermined thickness at each level transverse to the core cavity axis, whereby a symmetrical wedge-shaped gate is produced, and to provide a method and means for producing seats in gate valve bodies for cooperative engagement with said gate.

Briefly, the invention comprises a jig for so mounting a valve gate in a lathe for rotation about the axis of the cavity axis that the inclined faces thereof can be alternately presented perpendicular to the axis of a lathe spindle, and the stopped position of a cutting tool relative to the mounting means will provide a uniform thickness of valve on either side of a plane of symmetry that includes the cavity axis.

For a better understanding of the invention, reference is made to the following specification of a presently preferred embodiment of the invention, said specification to be read in connection with the accompanying drawing, wherein Fig. 1 is an exploded view of the invention, and Fig. 2 is a longitudinal section of the device (in assembled relation) illustrated in Fig. 1 and is shown engaging a valve gate, and Fig. 3 is a view of part of the device illustrated in Fig. 2 and illustrates an alternate form of chuck jaws engaging a gate valve body.

Reference now is made to the drawings. The jig comprises an offset adapter 16, a guide spindle 18, a chuck 20, a jam nut 22, an adjustable abutment element 24, and a pair of chuck jaws 26 provided with centers 28. The parts are assembled as illustrated in Fig. 2, and the abutment element 24 is held against rotation relative to spindle 18 by means of a key 30 (Fig. 2) formed in element 24 for engaging a keyway 32 (Fig. 1) formed on guide spindle 18. The jig as illustrated in Fig. 2 is shown engaging a valve gate 34. Valve gate 34 includes a pair of inclined annular plane surfaces 36 and 38 that are formed on opposite sides or faces of the gate. The gate 34 is formed with a cavity that is cylindrical at the upper end for engaging a gate stem and that is further constricted at the lower end. As was pointed out hereinabove, the axis of this cylindrical portion is known as the cavity axis. As will be seen by referring to Fig. 2, the valve gate is mounted for rotation about the cavity axis by means of centers 28. Each annular plane surface 36 and 38 is inclined at 5° to this axis and the included angle defining the wedge is therefore 10°. This gate is a standard item of manufacture, and has been described in detail only in order to fully explain the operation of the jig constituting the invention.

The offset adapter 16 is stepped in a known manner to prevent vibration due to eccentric and unbalanced forces. The rearward face 40 of offset adapter 16 includes pins 42 whereby the offset adapter can be mounted on the face plate 44 (Fig. 2) of a lathe. The face plate is mounted in the usual manner on the lathe spindle to be rotated thereby about the lathe spindle axis. The forward or work-engaging face 46 of adapter 16 is inclined at 5° to the rearward face 40. The adapter is centrally drilled and threaded along an axis normal to the forward face 46 for threadedly receiving guide spindle 18. It will thus be apparent that the axis of guide spindle 18 will intersect the lathe spindle axis at an angle of 5°.

The chuck 20 is slipped over the guide spindle 18 and is secured to the forward face 46 of adapter 16 by means of pins 48 received in corresponding recesses drilled in adapter 16. It will be apparent that the faces of chuck 20 will be parallel to the inclined face 46 of adapter 16, and that the faces of the chuck will therefore be inclined at 5° to a plane normal to the axis of the lathe spindle. Correspondingly, the axis of the centers 28 will intersect the lathe spindle axis at an angle slightly less than 90°; to be exact 90° less one-half the included angle of the gate or a net of 85°.

The jam nut 22 is slipped over the guide spindle 18 and is threadedly connected thereto. It will be apparent that the longitudinal position of nut 22 on spindle 18 can be varied by screwing the nut along the spindle. As will be seen clearly by reference to the sectional view of the device illustrated in Fig. 2, the inside diameter of the nut 22 is substantially greater than the outside diameter of the spindle 18. The forward portion of spindle 18 slidably receives the tubular portion of the abutment element 24. The abutment element 24 is secured against rotation relative to the spindle 18 by means of the aforementioned key 30 and keyway 32. The abutment element 24 also includes a forwardly curved portion 50 for engagement with valve gate 34.

After the jig has been assembled as described above, the gate is then mounted for rotation about its cavity axis in the chuck 20 by means of centers 28. The cavity axis of the gate will be tilted at an angle of 5° relative to a plane normal to the lathe spindle axis, said angle corresponding to the 5° tilt of the chuck 20. Since the faces of the gate are inclined at 5° to the cavity axis, it follows that the forward face of the gate can be made to lie in a plane that is perpendicular to the lathe spindle axis. When the gate is oriented by rotation about its cavity axis, the axis of centers 28, so that the forward face is perpendicular to the lathe spindle axis, the rearward face of the gate will be inclined to the lathe spindle axis at an angle equal to twice the angle at which the axis of the centers 28 is inclined to the lathe spindle axis minus 90°. In other terms, the rearward face of the gate can be seen to be inclined to the lathe spindle axis at an angle equal to 90° minus twice the angle between the opposite faces of the offset adapter. To accomplish this proper orientation of the gate 34 after it has been secured between centers 28 with face 36 positioned adjacent to element 24, the adjustable abutment element 24 is moved forward by means of the jam nut 22 and automatically rotates the gate a small amount about the axis of centers 28 until the gate has assumed a position with its forward face 36 perpendicular to the lathe spindle axis. When this position is reached the rotation of the gate automatically ceases because at that time the contacting surface 50 of the abutment element 24 will be contacting the plane surface 36 at locations on it lying on opposite sides of the plane defined by the lathe spindle axis and the axis of centers 28. There will thus be no further tendency to rotate the gate. It is only necessary that the contact surface of the abutment element 24 be so shaped as to contact, at locations lying on opposite sides of the plane defined by the axis of centers 28 and the lathe spindle axis, the plane which will be assumed by the surface 36 when the gate 34 is so oriented as to place the plane of surface 36 perpendicular to the lathe spindle axis. Preferably, however, the abutment element 24 should abut the plane in which lies surface 36 in substantial regions of contact such as lines of contact, or areas of contact as illustrated in Fig. 2 by the actual substantial extent of tangency of the surface 50 to the plane surface 36, and preferably, also, the regions of contact should be substantially spaced from each other on opposite sides of the plane defined by the axis of centers 28 and the lathe spindle axis. In the example illustrated in the drawing, the regions of contact are spaced from each other approximately at opposite ends of a diameter of the annular surface 36. The abutment element 24 thus provides reaction to the force and torque exerted by the cutting tool while being machined and insures that the forward face of the gate will remain perpendicular to the lathe spindle axis while the forward face of the gate is being machined.

After the forward face 36 has been machined, the jam nut 22 and the abutment element 24 are moved rearwardly away from the gate and the gate is then rotated through 180° about its cavity axis, thus positioning the previously rearward face 38 in position for machining. The abutment element 24 is then moved forwardly to engage the finished face 36 by means of nut 22, and the face 38 is then machined.

There has thus been disclosed means for insuring that the machining process to which the gate is subjected will result in a wedge-shaped gate. Symmetry of the gate on either side of the plane through the cavity axis bisecting the thickness of the gate is insured by means of a standard lathe stop acting in cooperation with the cutting tool that is machining the gate. It will be apparent that if the travel of the cutting tool is predetermined relative to the gate mounting means, the thickness of metal remaining in the walls of the gate can be accurately predetermined and it will be impossible for one gate wall to be unequal in thickness to the thickness of the other gate wall, and it will thus be seen that there has been provided a jig for producing a gate that is symmetrical about a plane of symmetry passing through the cavity axis thereof bisecting the thickness of the gate.

Reference is now made specifically to Fig. 3. There is illustrated a chuck 20 including chuck jaw 52 engaging a gate valve body 54. As mentioned hereinabove, with the exception of chuck jaws 52, the jig for supporting valve body 54 is otherwise identical with the jig for supporting the valve gate. Since gate valve bodies always include mounting flanges 56 at either end thereof, the chuck jaws 26 bearing centers 28 have conveniently been replaced by flange-engaging jaws 52. It is believed that the steps of machining the valve body will be apparent to those skilled in the art, since they are substantially identical to the steps of machining gate 34, and therefore no further description is believed necessary.

Obviously many modifications and variations of the present invention are possible in the light of the above teachings. It is therefore to be understood that within the scope of the appended claims the invention can be practiced otherwise than as specifically described.

The invention described herein may be manufactured and used by or for the Government of the United States of America for governmental purposes without the payment of any royalties thereon or therefor.

What is claimed is:

1. A jig for mounting a valve gate in a lathe comprising means for mounting a gate for rotation about a first axis with the cavity axis of said gate coincident with said first axis; means for securing said mounting means to rotate with the lathe spindle with said first axis intersecting the lathe spindle axis at an angle slightly less than 90° and so arranged that the faces of a gate mounted in said mounting means can be alternately presented perpendicular to the lathe spindle axis, and abutment means for engaging simultaneously at locations spaced on opposite sides of the plane defined by said intersecting axes the face of said gate which is not perpendicular to the lathe spindle axis for restraining said gate against displacement about its cavity axis during machining of the face which is perpendicular to the lathe spindle axis.

2. The device of claim 1 wherein the angle between said lathe spindle axis and said first axis is equal to 90° less one-half the included angle of the gate.

3. A jig for mounting a valve gate in a lathe comprising means secured to rotate with the lathe spindle and including mechanism adapted to mount a valve gate for rotation about an axis intersecting the lathe spindle axis at a predetermined angle and coincident with the cavity axis of said gate; adjustable abutment means carried by said first means and having a contacting surface contoured to contact in a plurality of points a plane perpendicular to the plane determined by said intersecting axes and inclined to the spindle axis at an angle equal to twice said predetermined angle minus 90°, certain of said points being substantially spaced from each other on opposite sides of said second-mentioned plane; means mounting said abutment means for movement in such a direction as to cause said contacting surface to approach said first-mentioned plane from one side of said first-mentioned plane whereby, when a valve gate is mounted in said mechanism, said abutment means can contact an adjacent face of said gate and rotate said gate until said adjacent face coincides with said first-mentioned plane; and means to lock said abutment means against unintentional retraction from adjusted position.

4. The device of claim 3 wherein said first-mentioned means includes a chuck having a pair of jaws carrying centers adapted to mount a valve gate for rotation about its cavity axis.

5. The device of claim 4 wherein said contacting surface of said abutment means is shaped to provide substantial regions of contact with said first-mentioned plane on opposite sides of said second-mentioned plane.

6. A jig for mounting a valve gate in a lathe comprising an offset adapter having a first face adapted to be engaged by the face plate of a lathe and having a second face opposed to said first face and inclined at a predetermined angle thereto, said adapter being adapted for attachment to said face plate to rotate therewith; a chuck mounted on said adapter against said second inclined face and secured to rotate with said adapter; said chuck having a pair of chuck jaws carrying centers adapted to mount a valve gate for rotation about the cavity axis thereof; a guide spindle fixed in said adapter and extending transversely out from said inclined second face through the body of said chuck; an adjustable abutment element mounted on said spindle, secured against rotation relative thereto, and longitudinally displaceable therealong; said abutment element including a portion adapted to engage in substantial regions of contact one face of a valve gate held between said centers, said regions of contact being substantially spaced from each other on opposite sides of the plane determined by the axis of said centers and the axis of rotation of said lathe face plate; and a jam nut threaded on said guide spindle for longitudinal displacement therealong for urging said abutment element into gate-engaging position.

7. The device of claim 6 wherein the contact portion of said abutment element is so shaped as to provide said regions of contact lying in a plane perpendicular to said first-mentioned plane and inclined to said axis of rotation of said lathe face plate at angle equal to 90° minus twice said predetermined angle.

References Cited in the file of this patent

UNITED STATES PATENTS

| Number | Name | Date |
|---|---|---|
| 1,457,994 | Nedland | June 5, 1923 |
| 1,937,240 | Odum | Nov. 28, 1933 |
| 2,309,260 | Strauss | Jan. 26, 1943 |
| 2,415,590 | Hendrickson et al. | Feb. 11, 1947 |
| 2,496,533 | Hendrickson et al. | Feb. 7, 1950 |